Jan. 8, 1929.
L. T. JOHNSON
SCALE
Filed Aug. 4, 1926
1,698,501
2 Sheets-Sheet 1
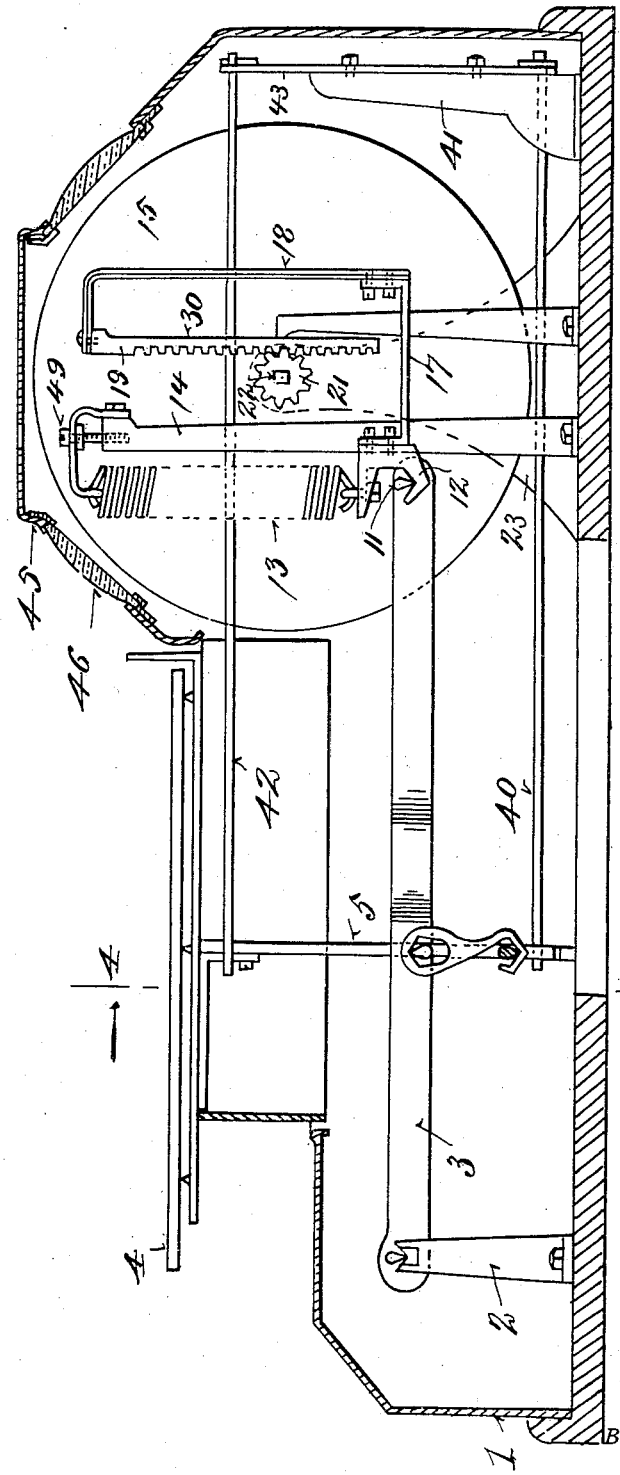
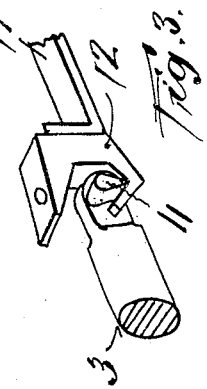
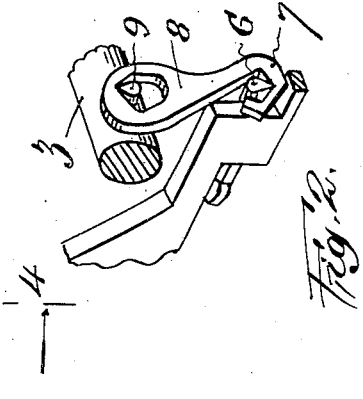
INVENTOR
Leonard T. Johnson
BY Darby & Darby
ATTORNEYS Jan. 8, 1929.　　　　　L. T. JOHNSON　　　　1,698,501
SCALE
Filed Aug. 4, 1926　　　2 Sheets-Sheet 2

Patented Jan. 8, 1929.

1,698,501

UNITED STATES PATENT OFFICE.

LEONARD T. JOHNSON, OF NEWARK, NEW JERSEY.

SCALE.

Application filed August 4, 1926. Serial No. 127,070.

This invention relates to scales, and has for its object the provision of a scale which is simple in structure, economical of manufacture, and efficient in operation.

A further object of the invention is to provide a scale which is exceedingly compact, and which eliminates the use of a vertical post ordinarily employed in scales.

A further object of the invention is to provide a scale of the split rotating cylinder type, wherein the actuating mechanism is all located within the split portions of the cylinder.

A further object of the invention is to provide a compact scale which permits the employment of a cover therefor, which, due to the bulk and size of the ordinary scale, is not ordinarily employed, although the desirability thereof is acknowledged.

Further objects of the invention will appear more fully hereinafter.

The invention consists substantially in the combination, construction, location and relative arrangement of parts, all as will be more fully hereinafter set forth, as shown by the accompanying drawings, and finally pointed out in the appended claims.

Referring to the drawings,

Fig. 1 is a view in vertical section side elevation, of a scale embodying my invention.

Fig. 2 is a view in perspective, showing the lever connections employed in accordance with my invention.

Fig. 3 is a similar view of a different connection.

The same part is designated by the same reference character wherever it occurs throughout the several views.

Figure 5:
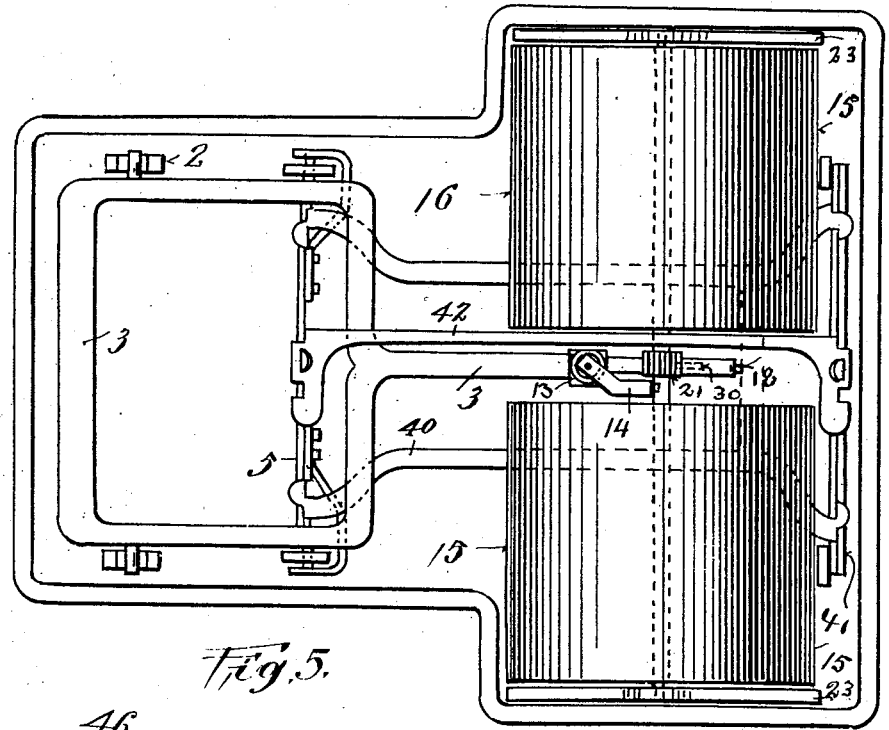
Fig. 5 is a top plan view of the scale of my invention, with the top thereof removed.
Figure 4:
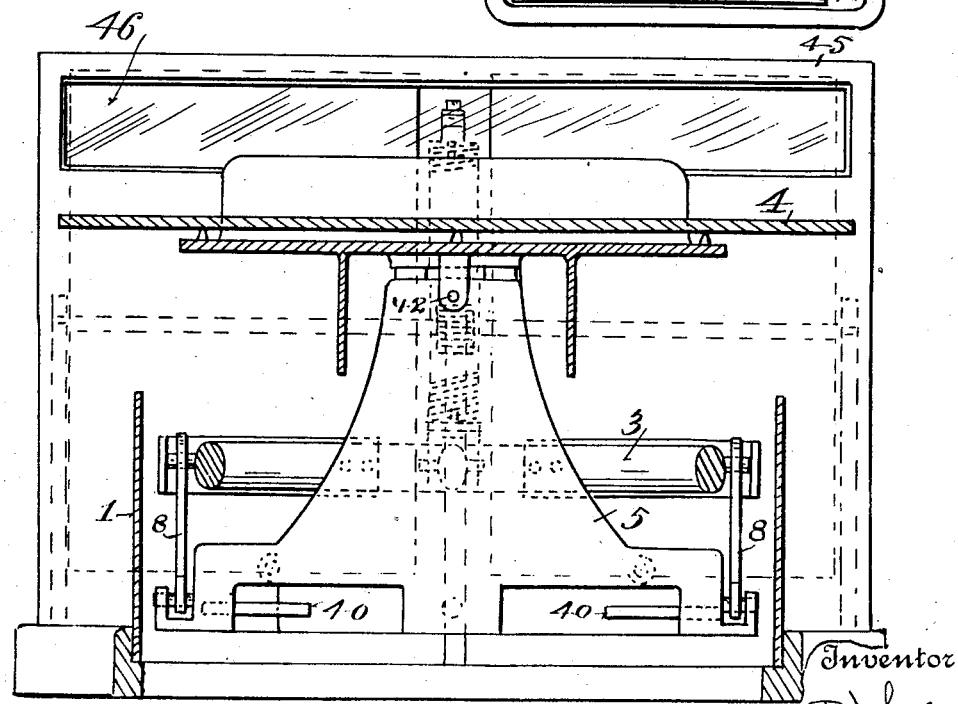
Fig. 4 is a view taken on the line 4—4 of Fig. 1, looking in the direction of the arrows.

It is among the special purposes of my present invention to provide a scale which eliminates the usual vertical post, thus enabling the production of a scale which is small and compact. I accomplish this without the sacrifice of accuracy, simplicity, or economy, by employing a split rotating cylinder type of scale, wherein all actuating mechanism extends into the cylinder itself, i. e., in the space between the split cylinders.

Referring to the drawings, reference character 1 designates the usual base, in which is mounted the fulcrum 2, which supports one end of the weighing lever 3. The table or platform 4 has a connection 5 extending through the top of the base 1, which has a pivot 6 which rests in a saddle 7, carried at one end of the link 8, which rests on the pivot 9 of the weighing lever 3.

The end of the lever 3 is provided with a pivot 11, which rests in the saddle 12, which is connected to the spring 13, the other end of the spring 13 being connected to post 14 mounted in the base 1 and located between the two cylinders 15 and 16. I provide an arm 17 rigidly connected at one end to the saddle 12, and at the other end to one end of a thermostat 18, the other end of which is connected to the rack 19 provided with the usual rack teeth 30, meshing with the gear wheel 21, mounted on the shaft 22 of the graduating scale cylinders 15 and 16, bars 23 for which are provided within the case or base 1. It will be noted that the thermostat device is the only connection between the spring and the rack rod. I make no claim thereto in the present case, as the same forms the subject matter of my copending application, Serial No. 127,069, filed August 4, 1926.

The lower check rod 40 is connected to the arm 5 of the platform 4, and is secured to a stationary part 41 of the scale mechanism. The upper check rod 42 extends through the scale, and is connected to the same support 41 in any suitable manner, for example, by means of the extension 43 thereof.

The usual cover 45 is provided, having the windows 46 and 47, so as to permit simultaneous reading of the graduations of the scale by customer as well as salesman.

It will be seen from the foregoing that I have provided an exceedingly simple and compact scale mechanism, eliminating the vertical post of the ordinary scale, and simplifying and condensing the structure by locating the scale cylinder in the base itself, and that I accomplish this by locating all the actuating mechanism in the space between the split scale cylinders, as distinguished from in the vertical post, as heretofore. This is true with the exception of the lever, which, it will be noted, extends into the space of the cylinders, but has a portion thereof to weight the portion actuated by the weighing platform or table in the horizontal extension of the base in the usual well known manner.

Any suitable zero adjustment device may be employed, for example, the simple standard arrangement shown at 49.

Many modifications and changes in details will readily occur to those skilled in the art, without departing from the spirit and scope of my invention as defined in the claims, but having now shown a structure embodying the principles of my invention, what I claim as new and useful and of my own invention, and desire to secure by Letters Patent is:

1. In a compensating scale, the combination with a casing, weight actuated mechanism, a scale drum comprising two separated sections, said weight actuated means lying in a plane which intersects the scale drum, a spring for resisting movement of said mechanism supported between said sections and operating connections between said mechanism and drums.

2. In a compensating scale, the combination with a casing, weight actuated mechanism, a scale drum comprising two separated sections, said weight actuated means lying in a plane which intersects the scale drum, a spring for resisting movement of said mechanism supported between said sections and rack and gear connections between said mechanism and drums.

3. In a compensating scale, the combination with weight actuated mechanism, a scale drum comprising two separated sections, said weight actuated means lying in a plane which intersects the scale drum, a spring for resisting movement of said mechanism supported between said sections and operating connections between said mechanism and drums.

4. In a compensating scale, the combination with weight actuated mechanism, a scale drum comprising two separated sections, said weight actuated means lying in a plane which intersects the scale drum, a spring for resisting movement of said mechanism supported between said sections and rack and gear connections between said mechanism and drums.

5. In a compensating scale, the combination with a weight actuated mechanism including a pivoted lever, a rotatable member comprising two separated drums, said pivoted lever lying in a plane which intersects said rotatable member, a spring for resisting the movement of said member attached to said lever and supported between said drums and connections between said lever and member.

6. In a compensating scale, the combination with a weight actuated mechanism including a pivoted lever, a rotatable member comprising two separated drums, said pivoted lever lying in a plane which intersects said rotatable member, a spring for resisting the movement of said member attached to said lever and supported between said drums and gear and rack connections between said lever and drums.

7. In a compensating scale, the combination with a weight actuated mechanism including a pivoted lever, a rotatable member comprising two separated drums, a spring for resisting the movement of said drums attached to said lever and supported between said drums and connections between said lever and drum, of a thermostatic device in said connections and a one piece detachable cover having separated windows for observing said drums.

8. In a compensating scale, the combination with a weight actuated mechanism including a pivoted lever, a rotatable member comprising two separated drums, a spring for resisting the movement of said drums attached to said lever and supported between said drums and gear and rack connections between said lever and drum, of a thermostatic device in said connections and a one piece detachable cover having separated windows for observing said drums.

9. In a compensating scale the combination with a casing, weight actuated mechanism, a scale drum comprising two separated sections, a spring for resisting movement of said mechanism supported between said sections and operating connections between said mechanism and drums, and a thermostatic device in said connections, said casing having windows on two sides thereof to permit inspection of said drum from opposite sides of the scale.

10. In a compensating scale the combination with a casing, weight actuated mechanism, a scale drum comprising two separated sections, a spring for resisting movement of said mechanism supported between said sections and rack and gear connections between said mechanism and drums, and a thermostatic device in said connections, said casing having windows on two sides thereof to permit inspection of said drum from opposite sides of the scale.

11. In a compensating scale, the combination with a casing, a weight actuated mechanism including a pivoted lever, a rotatable drum comprising two sections, a spring supported between said sections and attached to said lever connections between said lever and drum, and means for adjusting said drums to zero position exteriorly of the casing, said casing comprising one piece for enclosing all of said parts.

12. In a compensating scale, the combination with a casing, a weight actuated mechanism including a pivoted lever, a rotatable drum comprising two sections, a spring supported between said sections and attached to said lever connections between said lever and drum, and means for adjusting said drums to zero position exteriorly of the casing, of a thermostatic device in said connections.

13. In a compensating scale, the combination with a casing, a weight actuated mechanism including a pivoted lever, a rotatable drum comprising two sections, a spring supported between said sections and attached to said lever, gear and rack connections between said lever and drum, and means for adjusting said drums to zero position exteriorly of the casing, said casing comprising one piece for enclosing all of said parts.

14. In a compensating scale, the combination with a casing, a weight actuated mechanism including a pivoted lever, a rotatable drum comprising two sections, a spring supported between said sections and attached to said lever gear and rack connections between said lever and drum, and means for adjusting said drums to zero position exteriorly of the casing, of a thermostatic device in said connections.

In testimony whereof I have hereunto set my hand on this 22nd day of July A. D., 1926.

LEONARD T. JOHNSON.